No. 623,624. Patented Apr. 25, 1899.
P. PURVIANCE.
ACETYLENE GAS GENERATOR.
(Application filed June 2, 1898.)
(No Model.)
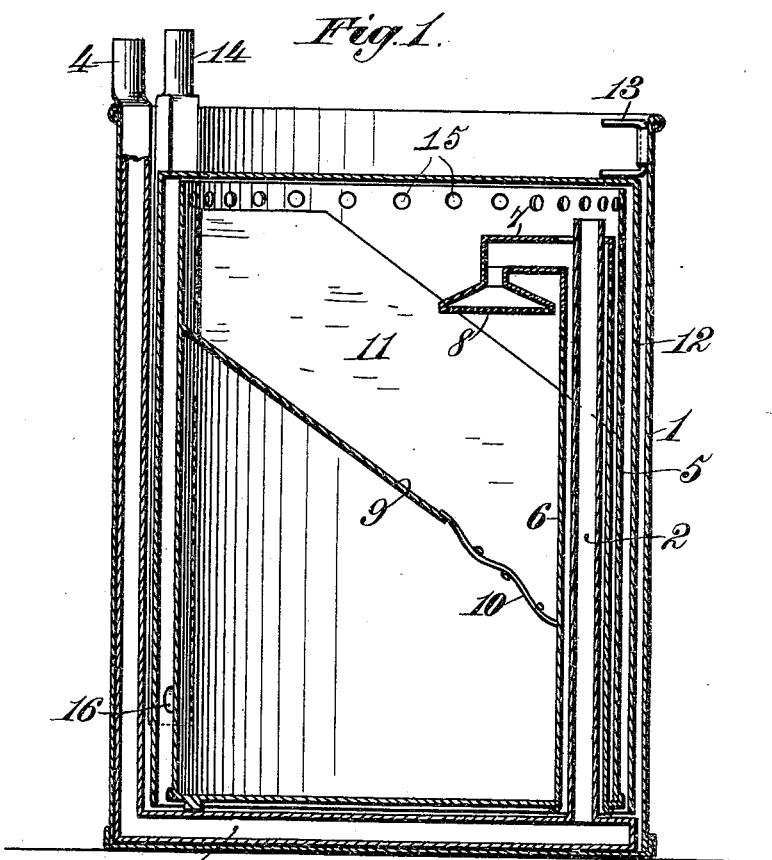
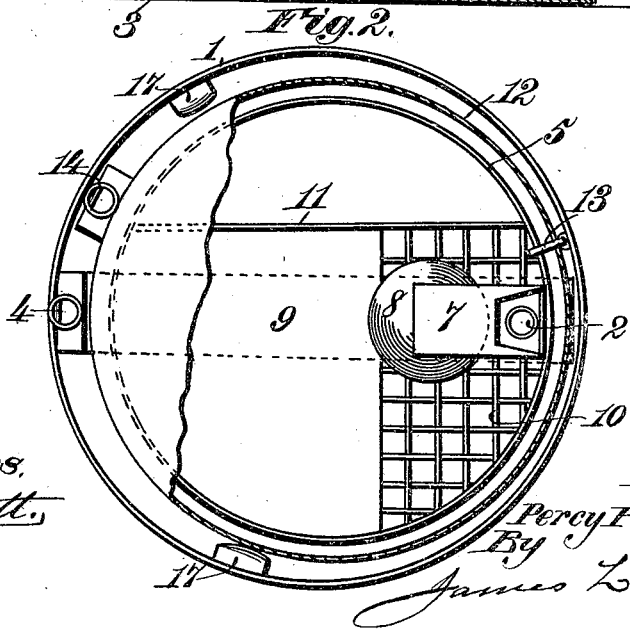
Witnesses,
Robert Everett,
F. B. Keefer
Inventor.
Percy Purviance,
By James L. Norris
Atty.

UNITED STATES PATENT OFFICE.

PERCY PURVIANCE, OF LINCOLN, NEBRASKA.

ACETYLENE-GAS GENERATOR.

SPECIFICATION forming part of Letters Patent No. 623,624, dated April 25, 1899.

Application filed June 2, 1898. Serial No. 682,392. (No model.)

*To all whom it may concern:*

Be it known that I, PERCY PURVIANCE, a citizen of the United States, residing at Lincoln, in the county of Lancaster and State of Nebraska, have invented new and useful Improvements in Apparatus for Generating Acetylene Gas, of which the following is a specification.

My invention relates to an improved apparatus for generating acetylene gas by the action of water on a suitable carbid; and the improvements have for their object to provide a simple, convenient, and safe arrangement of devices for effecting rapid production of dry acetylene gas in automatically-controlled quantities suited to the varying requirements of consumption.

The invention consists in features of construction and novel combinations of parts in an acetylene-gas generator, as hereinafter described and claimed.

In the annexed drawings, illustrating the invention, Figure 1 is a vertical transverse section of my improved acetylene-gas-generating apparatus. Fig. 2 is a plan of the same with the top of the generator-bell partly broken away.

The reference-numeral 1 in the drawings designates a preferably cylindrical outer tank or water vessel that may have any desired dimensions. In this outer tank 1 there is arranged a gas-pipe that comprises a vertical inlet portion 2 near one side of the tank, a horizontal portion 3 on the tank-bottom, and a vertical exit portion 4 in immediate contact with one side of the tank and extended above the same. The several parts of this gas-pipe are secured to each other and to the tank 1 in any suitable manner. The horizontal pipe portion 3 serves as a support for an inner tank 5, that has a closed bottom which is thus raised above the bottom of the outer tank.

In one side of the inner tank 5 there is a vertically-arranged water-pipe 6, that is preferably rectangular in cross-section. The lower end of this pipe 6 opens through the bottom of the inner tank 5, so as to communicate with the water-space of the outer tank. The upper end of the pipe 6 is also open, so that the open upper end of the gas-inlet pipe 2 may project above, as shown. At or near the open upper end of the water-pipe 6 there is an elbow or lateral extension 7, that supports a rose or sprinkler 8 at its outer end. This sprinkler 8 projects above the lower portion of an inclined shelf or chute 9, that is supported in the tank 5 in such manner as to serve as a carbid-holder and permit a gradual feeding of carbid downward to a point below the spray of water discharged from the rose or sprinkler. The lower portion of the inclined shelf or carbid-holder 9 is reticulated or constructed as a coarse sieve 10, through which the "ash" or exhausted carbid will drop to the bottom of the dry inner tank. A guard 11 is provided at the side of the carbid-holder or inclined shelf 9, so as to keep the lumps of carbid from falling over into the tank while feeding down toward the spray.

An intermediate inverted tank or bell 12 is placed in the annular space between the outer water-tank 1 and inner dry tank 5, so as to cover said inner tank and form therewith a gas-generating chamber. The upper part of the outer tank may be provided with any suitable catch or fastening 13 to engage the bell or inverted tank 12 and hold it in place. This bell or inverted tank 12 is provided with a safety gas-escape pipe 14, that may be connected with a pipe leading to the outside of a building, if desired. The escape-pipe 14 may be secured in a vertical position to the outside of the inverted tank 12 and communicates with the interior of said tank through an opening 16 at the lower end of the pipe, coinciding with a like opening in the tank-wall.

In practice the calcium carbid or other gas-generating material is placed on the inclined shelf 9 and the bell or inverted tank 12 is adjusted in position. Water is supplied to the outer tank 1 in sufficient quantity to rise through the pipe 6 to the elbow 7 and sprinkler 8, through which it sprays or drips onto the carbid. The exhausted carbid drops through the sieve 9 to the bottom of the inner dry tank 5, and the acetylene gas passes out through the pipe-sections 2, 3, and 4 to the burners or to any desired point for consumption or storage. A portion of the gas will escape over the rim of the inner dry tank 5 or through perforations 15 near its top, and thus exerts a pressure on the surface of the water outside the said tank. As the pressure of gas increases the water will be forced downward in the pipe 6 and also out of the space between the tanks 5 and 12 into the space outside the inverted tank. The generation of gas will cease as soon as the water in the pipe 6 falls below the elbow 7. If there is an excessive generation of gas, its pressure will cause the water outside the inverted tank 12 to rise so far as will bring the level of water in the space between the tanks 5 and 12 to a point below the inlet 16 to the safety gas-escape pipe 14, through which any dangerous excess of gas will then escape to the outside of the building. Thus the production of the gas is automatically regulated, and all the water that comes to the carbid is used, so that the ash falls to the bottom of the inner tank in a dry state. There is but a small amount of water-surface where the water could evaporate and unite with carbid when the apparatus is not in use.

If desired, suitable cleats 17 may be arranged in the outer tank 1 at convenient intervals to assist in guiding and bracing the bell or inverted tank.

In the operation of the apparatus there are no valves to be manipulated for controlling the production and pressure of the gas. The production of gas is controlled automatically, and by reason of the circulation of water beneath and around the inner dry tank 5 there will be no danger of overheating.

What I claim as my invention is—

1. In apparatus for generating acetylene gas, the combination of an outer water-tank having connected therewith a pipe for collection and exit of gas for consumption, an inner dry tank supported above the bottom of said water-tank, a carbid-holder supported in the upper part of the dry tank and provided with a bottom reticulated in part, a vertical water-pipe located in said dry tank around a portion of the gas collection and exit pipe and having its lower end in communication with the water-tank and its upper end provided with a sprinkler above the carbid-holder, an inverted tank intermediate the inner dry tank and outer water-tank, and a safety gas-escape pipe secured to the inverted tank, substantially as described.

2. In apparatus for generating acetylene gas, the combination of an outer water-tank having connected therewith a pipe for collection and exit of gas for consumption, an inner dry tank supported above the bottom of said water-tank, an inclined shelf or carbid-holder having a sieve at its lower end and supported in the upper part of the dry tank, a vertical water-pipe located in the side of said dry tank with its lower end in communication with the water-tank and having at its upper end a lateral extension provided with a sprinkler located above the carbid-holder, a bell or inverted tank intermediate the inner dry tank and outer water-tank, and a safety gas-escape pipe connected with said inverted tank, substantially as described.

3. In apparatus for generating acetylene gas, the combination of an outer water-tank having connected therewith a pipe for collection and exit of gas for consumption, an inner dry tank supported above the bottom of said water-tank and provided with perforations at the top, a carbid-holder supported in the dry tank, a vertical water-pipe located in the dry tank with its lower end in communication with the water-tank below the said dry tank and having at its upper end a lateral elbow provided with a sprinkler, an inverted tank intermediate the inner dry tank and outer water-tank, and a safety gas-escape pipe secured to the inverted tank, substantially as described.

In testimony whereof I have hereunto set my hand in presence of two subscribing witnesses.

PERCY PURVIANCE.

Witnesses:
GEO. W. JOHNSON,
H. T. FOLSOM.